United States Patent
Schaffer et al.

(10) Patent No.: US 11,558,596 B2
(45) Date of Patent: Jan. 17, 2023

(54) METHOD AND APPARATUS FOR DISTRIBUTION OF 3D TELEVISION PROGRAM MATERIALS

(71) Applicant: Google Technology Holdings LLC, Mountain View, CA (US)

(72) Inventors: Mark L. Schaffer, Carlsbad, CA (US); Siu-Wai Wu, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 17/145,734

(22) Filed: Jan. 11, 2021

(65) Prior Publication Data

US 2021/0136343 A1 May 6, 2021

Related U.S. Application Data

(63) Continuation of application No. 16/525,068, filed on Jul. 29, 2019, now Pat. No. 10,893,253, which is a (Continued)

(51) Int. Cl.
*H04N 13/161* (2018.01)
*H04N 13/194* (2018.01)
(Continued)

(52) U.S. Cl.
CPC ......... *H04N 13/161* (2018.05); *H04N 13/194* (2018.05); *H04N 19/597* (2014.11);
(Continued)

(58) Field of Classification Search
None
See application file for complete search history.

(56) References Cited

U.S. PATENT DOCUMENTS 8,249,426 B2 * 8/2012 Kei .......................... H04N 5/76
386/278
8,743,178 B2 6/2014 Filippini et al.
(Continued)

FOREIGN PATENT DOCUMENTS

CN 1682539 10/2005
JP 2011-014956 * 6/2009 ............ H04N 13/00
(Continued)

OTHER PUBLICATIONS

International Search Report dated Jul. 4, 2011 in International Patent Application No. PCT/US2011/032858.
(Continued)

*Primary Examiner* — Edemio Navas, Jr.
(74) *Attorney, Agent, or Firm* — Byrne Poh LLP

(57) ABSTRACT

Method, apparatus and computer readable media for receiving a multiprogram program transport service that includes one or more compressed video services and one or more 3D-2D conversion options, generating an uncompressed video signal by performing a decoding portion of a transcoding operation for one of the one or more of the video services, determining from the 3D-2D conversion option whether a 3D-2D conversion is to be performed, performing a scale conversion on the uncompressed video according to a specified type of 3D-2D conversion, generating a compressed video service by performing an encoding portion of a transcoding operation on the uncompressed video that has been scale converted, and generating a second multiprogram program transport service that includes the compressed video signal that has been 3D-2D converted.

17 Claims, 6 Drawing Sheets

Related U.S. Application Data continuation of application No. 14/966,048, filed on Dec. 11, 2015, now Pat. No. 10,368,050, which is a continuation of application No. 12/761,822, filed on Apr. 16, 2010, now Pat. No. 9,237,366.

(51) Int. Cl.
  *H04N 19/597* (2014.01)
  *H04N 21/2343* (2011.01)
  *H04N 21/236* (2011.01)
  *H04N 21/2662* (2011.01)

(52) U.S. Cl.
  CPC ... *H04N 21/2343* (2013.01); *H04N 21/23608* (2013.01); *H04N 21/234309* (2013.01); *H04N 21/234363* (2013.01); *H04N 21/2662* (2013.01)

(56) References Cited

U.S. PATENT DOCUMENTS

| | | |
|---|---|---|
| 2002/0030675 A1 | 3/2002 | Kawai |
| 2003/0223499 A1 | 12/2003 | Routhier et al. |
| 2004/0223049 A1 | 11/2004 | Taniguchi et al. |
| 2005/0248561 A1* | 11/2005 | Ito .................. H04N 13/189 345/419 |
| 2005/0259147 A1 | 11/2005 | Nam et al. |
| 2007/0183650 A1 | 8/2007 | Lipton et al. |
| 2008/0085049 A1 | 4/2008 | Naske et al. |
| 2008/0247673 A1* | 10/2008 | Kirihara ............ H04N 21/4405 382/304 |
| 2008/0303832 A1* | 12/2008 | Kim ................... H04N 13/178 345/501 |
| 2009/0025030 A1 | 1/2009 | Kasutani |
| 2009/0115901 A1* | 5/2009 | Winter .............. H04N 21/4316 348/565 |
| 2009/0142041 A1 | 6/2009 | Nagasawa et al. |
| 2009/0316047 A1 | 12/2009 | Sawada et al. |
| 2009/0317061 A1 | 12/2009 | Jung et al. |
| 2010/0064308 A1 | 3/2010 | Schaffer et al. |
| 2010/0086285 A1 | 4/2010 | Sasaki et al. |
| 2010/0134592 A1 | 6/2010 | Kim et al. |
| 2010/0299453 A1 | 11/2010 | Fox et al. |
| 2010/0329640 A1* | 12/2010 | Okada .................. G11B 20/10 386/252 |
| 2011/0149029 A1 | 6/2011 | Kellerman et al. |
| 2011/0216162 A1* | 9/2011 | Filippini .............. H04N 13/00 348/43 |
| 2012/0092453 A1 | 4/2012 | Suh |

FOREIGN PATENT DOCUMENTS

| | | |
|---|---|---|
| WO | WO 2004008768 | 1/2004 |
| WO | WO 2008054100 | 5/2008 |

OTHER PUBLICATIONS

Notice of Allowance dated Mar. 15, 2019 in U.S. Appl. No. 14/966,048.
Notice of Allowance dated Aug. 31, 2015 in U.S. Appl. No. 12/761,822.
Notice of Allowance dated Sep. 9, 2020 in U.S. Appl. No. 16/525,068.
Office Action dated Feb. 27, 2013 in U.S. Appl. No. 12/761,822.
Office Action dated Feb. 27, 2014 in U.S. Appl. No. 12/761,822.
Office Action dated Mar. 2, 2015 in U.S. Appl. No. 12/761,822.
Office Action dated Mar. 13, 2015 in CN Patent Application No. 201180019334.8.
Office Action dated Mar. 13, 2018 in U.S. Appl. No. 14/966,048.
Office Action dated Apr. 20, 2020 in U.S. Appl. No. 16/525,068.
Office Action dated May 28, 2014 in CN Patent Application No. 201180019334.8.
Office Action dated Jul. 21, 2014 in U.S. Appl. No. 12/761,822.
Office Action dated Aug. 14, 2015 in CN Patent Application No. 201180019334.8.
Office Action dated Aug. 31, 2012 in U.S. Appl. No. 12/761,822.
Office Action dated Sep. 4, 2018 in U.S. Appl. No. 14/966,048.
Office Action dated Sep. 28, 2017 in U.S. Appl. No. 14/966,048.
Office Action dated Dec. 3, 2015 in CN Patent Application No. 201180019334.8.

* cited by examiner

2D to 3D Conversion Matrix

| Input Resolution | Input Format | Output Resolution | Output Format |
|---|---|---|---|
| 1920 X 1080 X 30 | SBS 3D | 1920 X 1080 X 30 | 2D (left) |
| | OU 3D | 1920 X 1080 X 30 | 2D (top) |
| | Column interleave | 1920 x 1080 x 30 | 2D (even columns) |
| 1280 X 720 X 60 | SBS 3D | 1280 X 720 X 60 | 2D (left) |
| | OU 3D | 1280 X 720 X 60 | 2D (top) |
| | Column interleave | 1280 X 720 X 60 | 2D (even columns) |
| | Line interleave | 1280 X 720 X 60 | 2D (even lines) |
| | Checkerboard | 1280 X 720 X 60 | 2D |
| 1920 X 1080 X 60 | SBS 3D | 1280 X 720 X 60 | 2D (left) |
| | OU 3D | 1280 X 720 X 60 | 2D (top) |
| | Frame Sequential 3D | 1920 X 1080 X 30 | 2D (odd frames) |
| | Column interleave | 1280 X 720 X 60 | 2D (even columns) |
| | Line interleave | 1280 X 720 X 60 | 2D (even lines) |
| | Checkerboard | 1280 X 720 X 60 | 2D |

*FIG. 8*

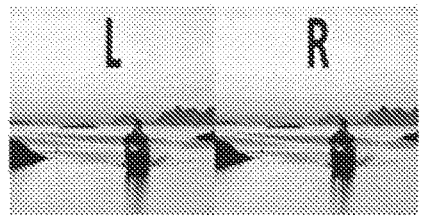

*FIG. 9*

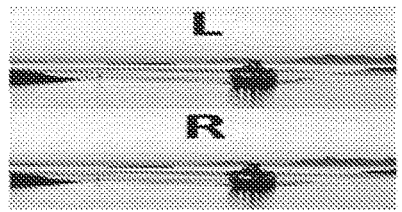

*FIG. 10*

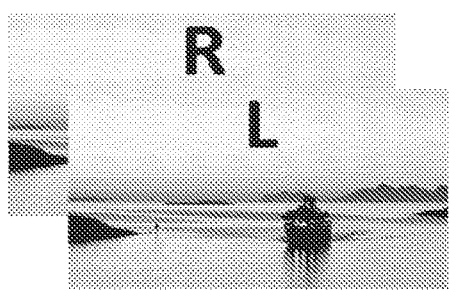

*FIG. 11*

|   |   |   |   |   |   |   |   |
|---|---|---|---|---|---|---|---|
| X | O | X | O | X | O | X | O |
| X | O | X | O | X | O | X | O |
| X | O | X | O | X | O | X | O |
| X | O | X | O | X | O | X | O |
| X | O | X | O | X | O | X | O |
| X | O | X | O | X | O | X | O |
| X | O | X | O | X | O | X | O |
| X | O | X | O | X | O | X | O |

*FIG. 12*

METHOD AND APPARATUS FOR DISTRIBUTION OF 3D TELEVISION PROGRAM MATERIALS

CROSS-REFERENCE TO RELATED APPLICATIONS

This application is a continuation of U.S. patent application Ser. No. 16/525,068, filed Jul. 29, 2019, which is a continuation of U.S. patent application Ser. No. 14/966,048, filed Dec. 11, 2015, which is a continuation of U.S. patent application Ser. No. 12/761,822, filed Apr. 16, 2010, each of which is hereby incorporated by reference herein in its entirety.

TECHNICAL FIELD

This invention relates to a method and apparatus for distribution of three dimensional (3D) television program materials.

BACKGROUND

Referring to FIGS. 1 and 2 of the drawings, schematic block diagrams illustrate a conventional system for distributing television program material to viewers. The schematic diagram of FIG. 1 illustrates a program uplink portion 5 of the system, and the schematic diagram of FIG. 2 illustrates a cable network portion 15 of the system. A television program provider, such as a company that operates a broadcast network, may operate a production facility 6 (FIG. 1) at which it produces a program signal AV having an uncompressed video signal (UVS) representing a sequence of pictures and at least one corresponding audio component. The video portion of the program signal may be a 3D uncompressed video signal, using conventional left-right images. In order to distribute the program signal to a wide audience of viewers, the program provider, a satellite uplink operator and a cable network operator enter into commercial arrangements whereby the program provider provides program content to the uplink operator, which delivers the content to the cable operator, which in turn delivers the content to viewers having decoding and presentation equipment connected to a cable distribution network 10 (FIG. 2).

The commercial arrangements between the uplink operator and the cable operator may provide that the uplink operator will supply certain services (corresponding to what are commonly referred to as channels, such as NBC or FOX, in the broadcast television domain) to the cable operator. The uplink operator has an interest in ensuring that the program material delivered by the cable operator to viewers meets quality standards prescribed by the program provider.

The uplink operator receives the uncompressed program signal AV provided by the program provider (for example on tape or by accessing a server) and supplies the program signal to an encoder/multiplexer 12 (FIG. 1), which encodes the pictures using a video coding algorithm and thereby creates a bitstream that represents a corresponding sequence of coded pictures (also known as video access units). For the purpose of this description we shall assume that the video coding algorithm produces a bitstream that conforms to the video coding standard known as MPEG 4. The encoder/multiplexer also encodes the corresponding audio signal(s) and creates a bitstream representing a sequence of coded audio frames (also known as audio access units). The encoder/multiplexer 12 packetizes the bitstreams as video and audio packetized elementary streams (PESs), encrypts the video and audio PESs, and combines the encrypted video and audio PESs with video and audio PESs for other services offered by the program provider to form an MPEG multi-program transport stream (MPTS). A transmitter 14 employs the MPTS bitstream to modulate an RF carrier and transmits the modulated carrier via a satellite transponder (not shown) to a cable distribution system headend 20 (FIG. 2). Current transponder channels have sufficient capacity (up to 77 Mb/s) to transmit an MPTS containing ten or more high definition (HD) MPEG 4 services, each corresponding to a single broadcast television channel. The uplink operator may also operate other encoder/multiplexers and transmitters for creating and transmitting other MPTSs containing other program signals via respective transponder channels.

The headend 20 includes several receivers 24 that are tuned to the transmission frequencies of the transponders respectively and recover the MPTS bitstreams from the respective RF carriers, extract the encrypted MPEG 4 bitstreams from the MPTSs, and decrypt the MPEG 4 bitstreams.

MPEG 4 provides substantially better compression of video material than the video coding standard known as MPEG 2, but there is an installed base of set top decoders is overwhelmingly MPEG 2 set top decoders. Accordingly, although the uplink operator typically transmits video material in the form of MPEG 4 data, as discussed above, the cable distribution system operator is constrained by the needs of the installed base to supply the video material to the subscribers in the form of MPEG 2 data. Therefore, the headend 20 also includes transcoders 26 that transcode the MPEG 4 bitstreams to MPEG 2, and a multiplexer 30 that creates one or more MPTSs each containing several MPEG 2 services. Transmitters 34 utilize respective cable channels to transmit the MPEG 2 MPTSs to subscriber nodes over the cable network 10.

The decoding and presentation equipment at a subscriber node may include a set top decoder 38 and a television set 40. The set top decoder includes suitable devices for selecting a service based on a channel selection command provided by the subscriber, typically using a remote control unit, decomposing the cable channel MPTS that contains the selected service, and decoding the audio and video bitstreams for the selected service to create suitable audio and video signals for driving the television set 40.

Video streams that provide three dimensional (3D) viewing are now starting to be provided by programmers to operators. The 3D aspect is provided in the video streams in certain 3D systems by dedicating one half of the pixels that defined in a specified format for a left image and the other half of the pixels for a right image. In these systems, the left and right images are presented on the TV in such a manner that by the use of special glasses, the viewer experiences the presented image as a 3D image. However, when these video stream are presented on a legacy (two dimensional only) TV and viewed without the special 3D glasses, they are seen at best as blurry images.

At this time, one method for overcoming this problem is for the programmer to provide two video streams for each 3D program: a 3D video stream and a 2D video stream. This approach uses up more bandwidth than simply providing a 3D video stream to the operator.

SUMMARY

In one aspect, a method of distributing video program material includes receiving a multiprogram program transport service that includes one or more compressed video services and one or more 3D-2D conversion options. Each 3D-2D conversion option is applicable to one or more of the compressed video services as identified by each 3D-2D conversion option. An uncompressed video signal is generated by performing a decoding portion of a transcoding operation for one of the one or more of the video services. A determination is made from the 3D-2D conversion option whether a 3D-2D conversion is to be performed. When a determination is made that a 3D-2D conversion is to be performed, scale conversion is performed on the uncompressed video according to a specified type of 3D-2D conversion, using one of a left and right 3D view that are both included in the uncompressed video signal. A compressed video service is generated by performing an encoding portion of a transcoding operation on the uncompressed video that has been scale converted. A second multiprogram program transport service is generated that includes the compressed video signal that has been 3D-2D converted.

In a second aspect, a processing system includes an input-output function and a processor. The input-output function receives a multiprogram program transport service that includes one or more compressed video services and one or more 3D-2D conversion options. Each 3D-2D conversion option is applicable to one or more of the compressed video services as identified by each 3D-2D conversion option. The processor generates an uncompressed video signal by performing a decoding portion of a transcoding operation for one of the one or more of the video services and determines from the 3D-2D conversion option whether a 3D-2D conversion is to be performed. When a determination is made that a 3D-2D conversion is to be performed, the processor performs a scale conversion on the uncompressed video according to a specified type of 3D-2D conversion, using one of a left and right 3D view that are both included in the uncompressed video signal, and generates a compressed video service by performing an encoding portion of a transcoding operation on the uncompressed video that has been scale converted. The input-output function then generates a second multiprogram program transport service that includes the compressed video signal that has been 3D-2D converted.

In a third aspect, a tangible computer readable media includes program instructions that, when executed by a processing system, cause a programming system to receive a multiprogram program transport service that includes one or more compressed video services and one or more 3D-2D conversion options. Each 3D-2D conversion option is applicable to one or more of the compressed video services as identified by each 3D-2D conversion option. The instructions further cause the programming system to generate an uncompressed video signal by performing a decoding portion of a transcoding operation for one of the one or more of the video services and make a determination from the 3D-2D conversion option whether a 3D-2D conversion is to be performed. When a determination is made that a 3D-2D conversion is to be performed, the instructions further cause the programming system to perform scale conversion on the uncompressed video according to a specified type of 3D-2D conversion, using one of a left and right 3D view that are both included in the uncompressed video signal. The instructions further cause the programming system to generate a compressed video service by performing an encoding portion of a transcoding operation on the uncompressed video that has been scale converted and generate a second multiprogram program transport service that includes the compressed video signal that has been 3D-2D converted.

In any of the first or second or third aspects, the transcoding may be from MPEG4 to HD MPEG2. In any of the first or second or third aspects, the uncompressed video that has been scale converted may be down converted, such as to SD MPEG2. In any of the first or second or third aspects, specification of the type of 3D-2D conversion may be by a default value, and the determination as to whether to perform the 3D-2D conversion is explicit in the 3D-2D conversion option. In any of the first or second or third aspects, the type of 3D-2D conversion may be specified by a value in the 3D-2D conversion option.

The unique 3D-2D conversion techniques and apparatuses described herein allow a system operator to provide 2D video streams for customer having legacy set-top boxes and 2D TVs by converting programs supplied only in 3D format to the headend. This provides video services which customers having legacy TV's would not be able to enjoy unless they acquired a set top box which performed the 3D-2D conversion, which may be unavailable or costly.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments. Reference will now be made to the accompanying drawings, in which:

FIG. 8 is a matrix that illustrates one exemplary table of 3D-2D scale conversions, in accordance with certain embodiments.

FIGS. 9-14 are illustrations that show where the left and right image pixels may be located in a picture stream, in accordance with certain embodiments, FIG. 15 is a block schematic diagram of a computing machine that may be used to implement parts of the head end equipment shown in FIG. 4, in accordance with certain embodiments.

DETAILED DESCRIPTION

An uplink operator negotiates with a cable operator to provide television program services desired by the cable operator and determines how many cable MPTSs (for example, some MPTSs may contain three HD MPEG 2 services, one or more of which may be 3D) will be required to supply these services to the subscribers and which services should be provided in a given cable MPTS in order to optimize use of the cable channel without impairing the quality of services. The uplink operator's determination will be based in part on the service packages offered by the cable operator and on the bit rate requirement of the different services. For example, it would not generally be desirable to allocate more than one HD sports service to a given cable MPTS because of the high bit rate required for a satisfactory viewing experience. Let us assume that the uplink operator and the cable operator determine that m cable MPTSs will be needed.

Figure 1:
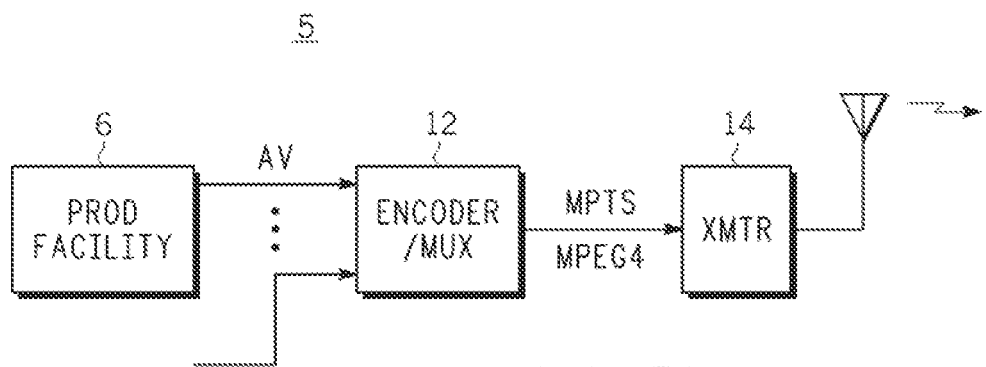
FIG. 1 is a schematic block diagram illustrating a program uplink portion of a system for distributing television program material to viewers.

The commercial arrangements between the uplink operator and the cable operator typically require that for each cable MPTS the cable operator utilize an integrated receiver/decrypter (IRD) having specific features and that the cable MPTS signal produced by the IRD should contain services specified by the uplink operator. In practice, of course, the cable operator will utilize m IRDs, producing respective cable MPTSs, to provide the services offered by the cable operator to its subscribers. While FIG. 1 illustrates current system configuration, is it also generic enough to encompass the embodiments described herein, although certain of the items in FIG. 1 would then incorporate unique features that are described herein below.

Figure 3:
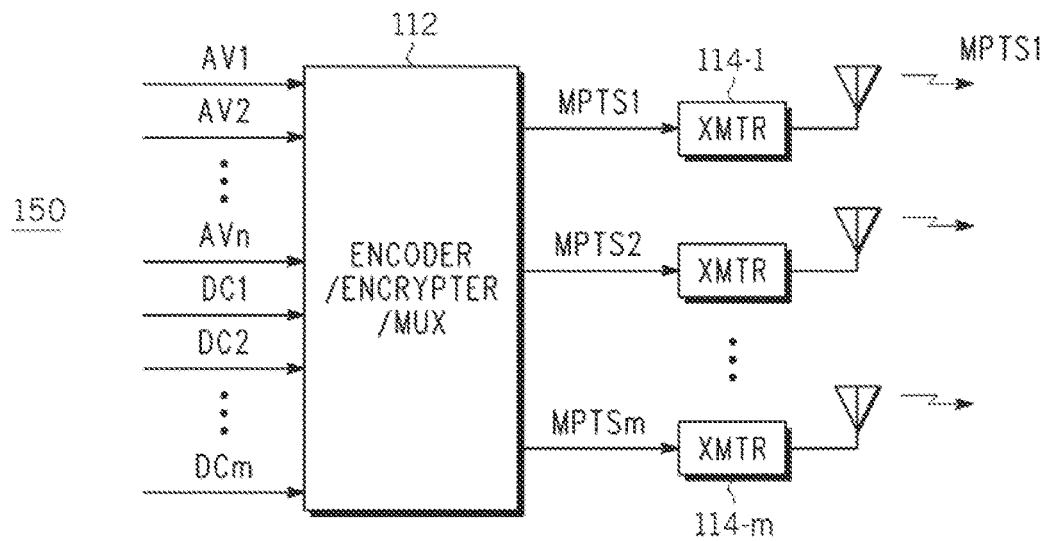
FIG. 3 is a schematic block diagram illustrating an uplink portion of a system for distributing television program material to viewers, in accordance with certain embodiments.
Figure 4:
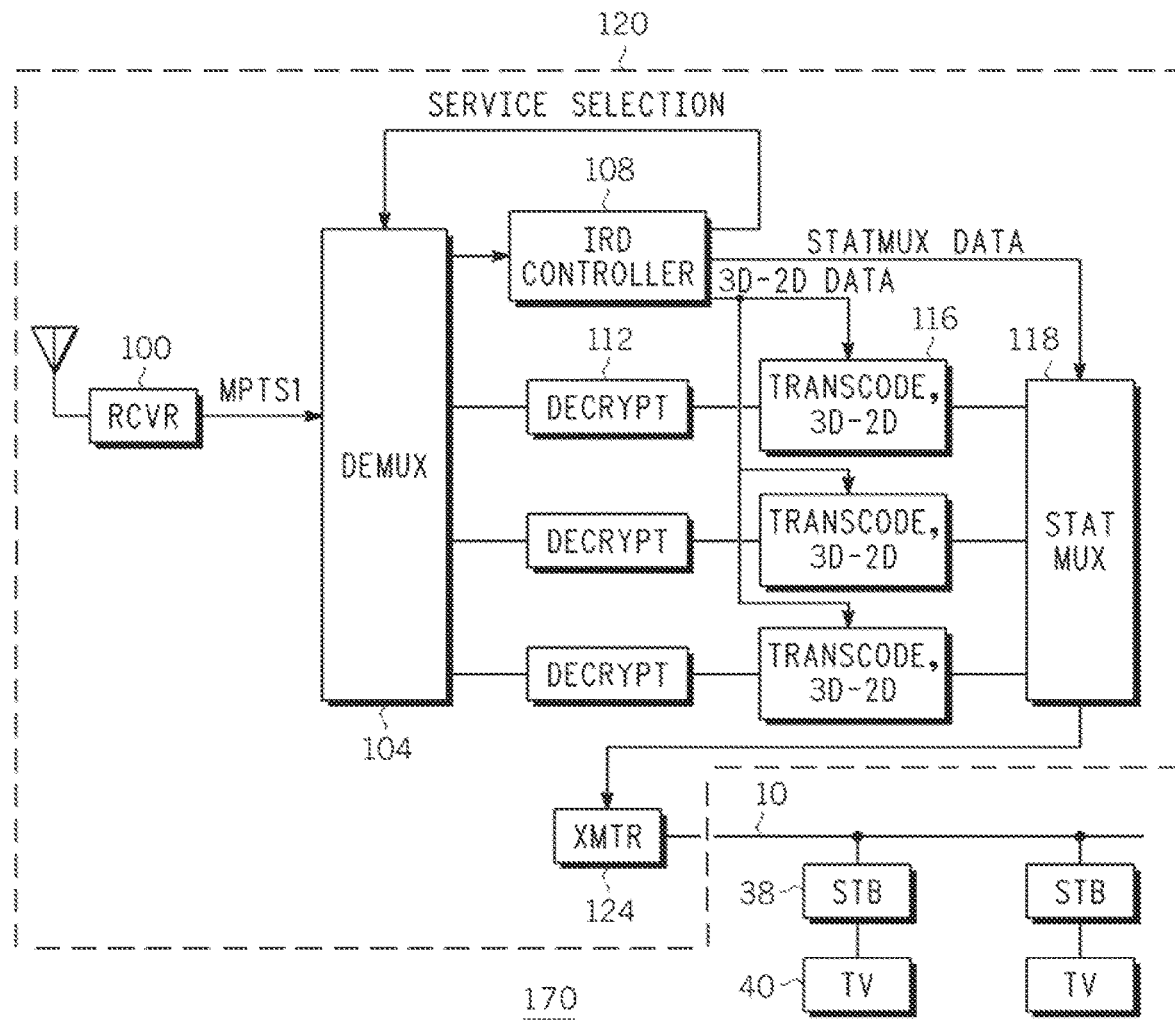
FIG. 4 is a schematic block diagram illustrating a cable network portion of a system for distributing television program material to viewers, in accordance with certain embodiments.

Referring now to FIGS. 3 and 4, schematic block diagrams illustrate a system including headend equipment for distributing television program material to viewers, in accordance with certain embodiments. The schematic diagram of FIG. 3 illustrates an uplink portion 150 of the system, and the schematic diagram of FIG. 4 illustrates a cable network portion 170 of the system. The uplink operator supplies several uncompressed video signals AV1-AVn provided by a television program provider to an encoder/encrypter/multiplexer 112 (referred to hereinafter simply as the multiplexer 112). The signals AV1-AVn may be in the HD-SDI format specified in SMPTE 292M, with the audio component embedded in the ancillary data space. The uplink operator also supplies m distribution constraint signals (one for each cable MPTS) that convey distribution constraint data DC1-DCm to the multiplexer 112. The nature of the distribution constraint data embodied in the distribution constraint signals will be discussed in more detail below, but it is sufficient at this point to say that the multiplexer 112 generates m MPTSs where MPTSj (j=1 . . . m) contains as many as ten HD MPEG 4 services and a packetized data elementary stream containing the distribution constraint data DCj. Since the distribution constraint data is included in the same MPTS as the services, it is in-band with the services.

Figure 2:
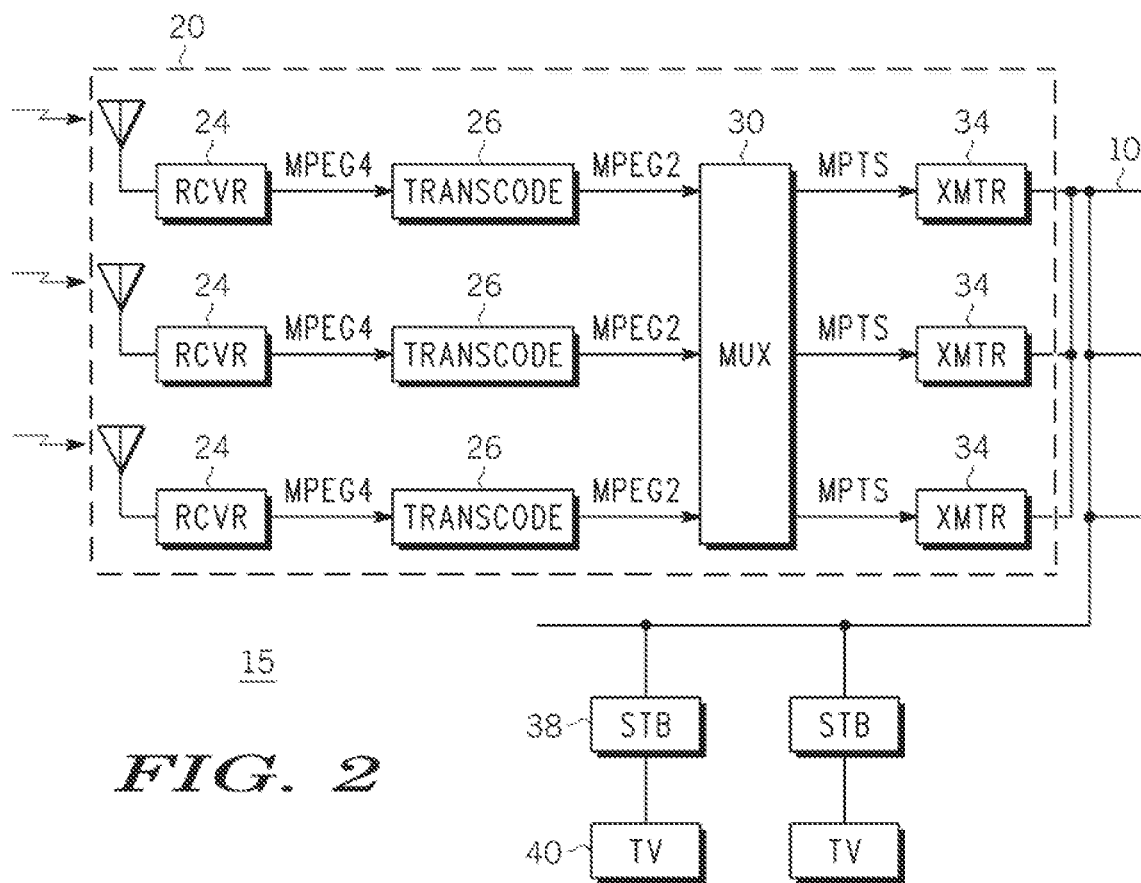
FIG. 2 is a schematic block diagram illustrating a cable network portion of a system for distributing television program material to viewers.

Transmitters 114-*j* (1<=j<=m) employ the MPEG 4 MPTS bitstreams to modulate respective RF carriers and transmit the modulated carriers via respective satellite transponders to the cable distribution system headend 20 (FIG. 2). The headend 20 includes m Integrated Receiver Demultiplexers (IRDs), only one of which, IRD 120, is shown in FIG. 4. The IRD 120 is partially under control of the uplink operator by means of the distribution constraint data.

Figure 5:
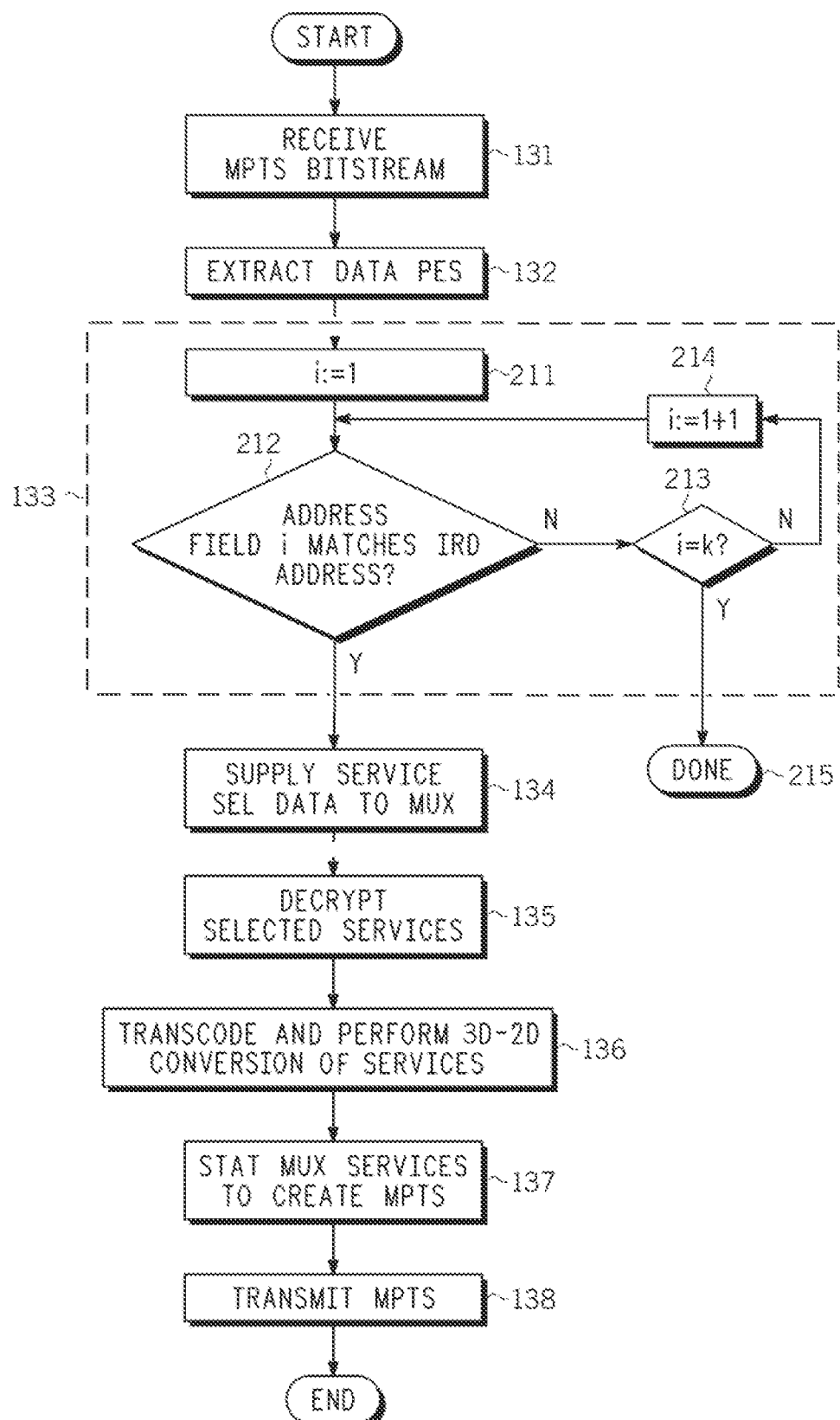
FIG. 5 is a flow chart illustrating operation of the headend equipment of the system shown in FIGS. 3 and 4, in accordance with certain embodiments.

FIG. 5 of the drawings is a flow chart illustrating certain steps of operation of the headend equipment of the system shown in FIG. 4 in accordance with certain embodiments Referring now to both FIG. 4 and FIG. 5 of the drawings, the IRD 120 includes a receiver 100 that is tuned to one of the m satellite transponder channels and thus receives a carrier that is modulated with a multi-program transport stream containing, for example, ten encrypted MPEG 4 services. Assume that the IRD 120 is tuned to the transponder channel that conveys MPTS1 and that MPTS1 contains services AV1-AV10. The receiver demodulates the carrier and outputs the MPTS bitstream, which contains not only the ten encrypted MPEG 4 services AVI-AVIO but also the packetized data stream that contains the distribution constraint data DC1, to a demultiplexer 104. The demultiplexer 104 receives (FIG. 5, step 131) the MPTS and extracts the packetized data stream (FIG. 5, step 132), which conveys the distribution constraint data from the MPTS and supplies the data stream to an IRD controller 108.

The IRD has a unique access control address (similar in function to the MAC address assigned to a network adapter). The distribution constraint data is in the form of vectors each having an access address field, a service selection field, a statmux field, and a 3D-2D conversion field. Note that in some systems, statistical multiplexing is not used, in which case the distribution constraint data may include substantially only the 3D-2D conversion data. The uplink operator generates the distribution constraint data based on the commercial arrangements with the cable operators. For example, for each IRD that is designated to transmit a cable MPTS containing one or more of the services contained in MPTSj, the distribution constraint data conveyed by the data stream included in MPTSj contains a vector that includes the access control address of the designated IRD, service selection data identifying the services that are to be included in the cable MPTS produced by the IRD, statmux data (discussed below) for each of those services, and 3D-2D conversion data. The service selection data that is recovered from the MPEG 4 MPTS specifies the three services that are to be included in the MPEG 2 MPTS.

Suppose, for example, that k IRDs are designated to transmit a cable MPTS containing one or more of the services contained in MPTSj and the particular IRD 120 shown in FIG. 4 is designated to produce a cable MPTS containing the services AV1, AV2 and AV3.

The IRD controller 108 compares the address field of the vector i (i=1 to k) with the access control address of the particular IRD at step 133 shown in FIG. 5, and selects the particular vector whose address field matches. Step 133 is accomplished, in certain embodiments, by steps 211-214 of FIG. 5. At step 211 an index value, i, is reset to 1. At step 212, a determination is made as to whether the index value matches the address of the IRD. When the values do not match, a test is made at step 213 to determine if the index value has reached a limit value of k. When the limit value k has not been reached, the index value is incremented at step 214 and step 212 is re-executed with the new value. When the limit value k has been reached, the method ends at step 215. When, at step 212 the values do match, then the particular vector is selected and the data in the vector is used in certain of the subsequent steps. Step 134 is then executed, in which IRD controller supplies the service selection data contained in the selected vector to the demultiplexer 104, which employs this information to select (in this case) the packetized elementary streams (PESs) for the services AV1, AV2 and AV3. The IRD controller also outputs the statmux data and 3D-2D conversion data contained in the fields of the selected vector. The statmux data is coupled to a statistical multiplexer 118. The 3D-2D conversion data is coupled to transcoders 116. If the access control address of the IRD does not match the address field of any of the distribution constraint data vectors, the IRD is not enabled to utilize the audio and video PESs in MPTS1 to create a cable MPTS.

The demultiplexer 104 supplies the encrypted audio and video PESs for the three selected services AV1, AV2 and AV3 to respective decrypters 112, which decrypt the selected services (FIG. 5, step 135) and supply the respective decrypted MPEG 4 audio and video PESs to respective transcoders 116. The transcoders perform 3D-2D scale conversion according to the 3D-2D data in the 3D-2D field of the distribution constraint data, when the 3D-2D data indicates that a conversion is necessary and convert the MPEG 4 PESs to corresponding MPEG 2 PESs (step 136). The transcoder 116 may decode the MPEG 4 video access units and create a sequence of decoded pictures and then perform 3D-2D conversion and encode the pictures using an MPEG 2 coder. The transcoding may alternatively be accomplished without completely decoding the MPEG 4 video access units when 3D-2D conversion is not specified by the 3D-2D conversion data in the 3D-2D field of the distribution constraint data. However, because the frequency decomposition algorithms for MPEG 4 and MPEG 2 are different, it will generally be necessary to decode the MPEG 4 video access units at least to the level of blocks of chroma and luma values.

The transcoders 116 supply the audio and video PESs of the three MPEG 2 services to a statistical multiplexer 118 for creating a multi-program transport stream. The three program streams are statistically multiplexed (FIG. 5, step 137) in order to fit in the available 38.8 Mb/s bit rate of a cable channel, but bit rate allocation decisions are made on the basis of the statmux data provided by the IRD controller 108. The statmux data may, for example, specify minimum bit rate and maximum bit rate for each service. By including the statmux data in the transponder MPTS, the uplink operator is able to ensure that the MPEG 2 services meet the quality standards set by the uplink operator or program service provider.

The MPTS created by the statistical multiplexer 118 is supplied to a transmitter 124, which modulates an RF carrier with the MPTS bit stream in accordance with a quadrature amplitude modulation (QAM) scheme and transmits (FIG. 5, step 138) the modulated carrier over the cable network 110 to subscriber nodes.

Another cable operator may be authorized to distribute a cable MPTS containing services AV1, AV2 and AV4. This cable operator employs headend equipment including an IRD (not shown) having a receiver that is tuned to the transponder that conveys MPTS 1 and the vector that includes the access control address of that IRD includes service selection data that specifies the services AV1, AV2 and AV4 and statmux data for those three services.

It will be appreciated that in accordance with certain embodiments, 3D-2D conversion may be performed without the use of statistical multiplexing in an IRD that is designed for statistical multiplexing but in which the distribution constraint data does not specify the use of statistical multiplexing, or in an IRD that is not designed for statistical multiplexing. In an IRD that is designed for straight multiplexing, (not statistical multiplexing) the block diagram would be very similar to FIG. 4 except that the signal called STATMUX DATA could either be missing, or could simply indicate a number of MPEG signals to multiplex.

It will be further appreciated that in accordance with certain embodiments, 3D-2D conversion could be performed in any piece of equipment that receives a compressed video stream or that internally generates a compressed video signal from some internal source, and receives 3D-2D conversion meta data that corresponds to the compressed video signal and indicates that 3D-2D conversion should be performed and what scaling to use for the conversion. In these embodiments, the piece of equipment decompresses the compressed video signal, converts and scales the uncompressed video signal according to a specified scaling conversion, and generates a compressed video signal.

Figure 6:
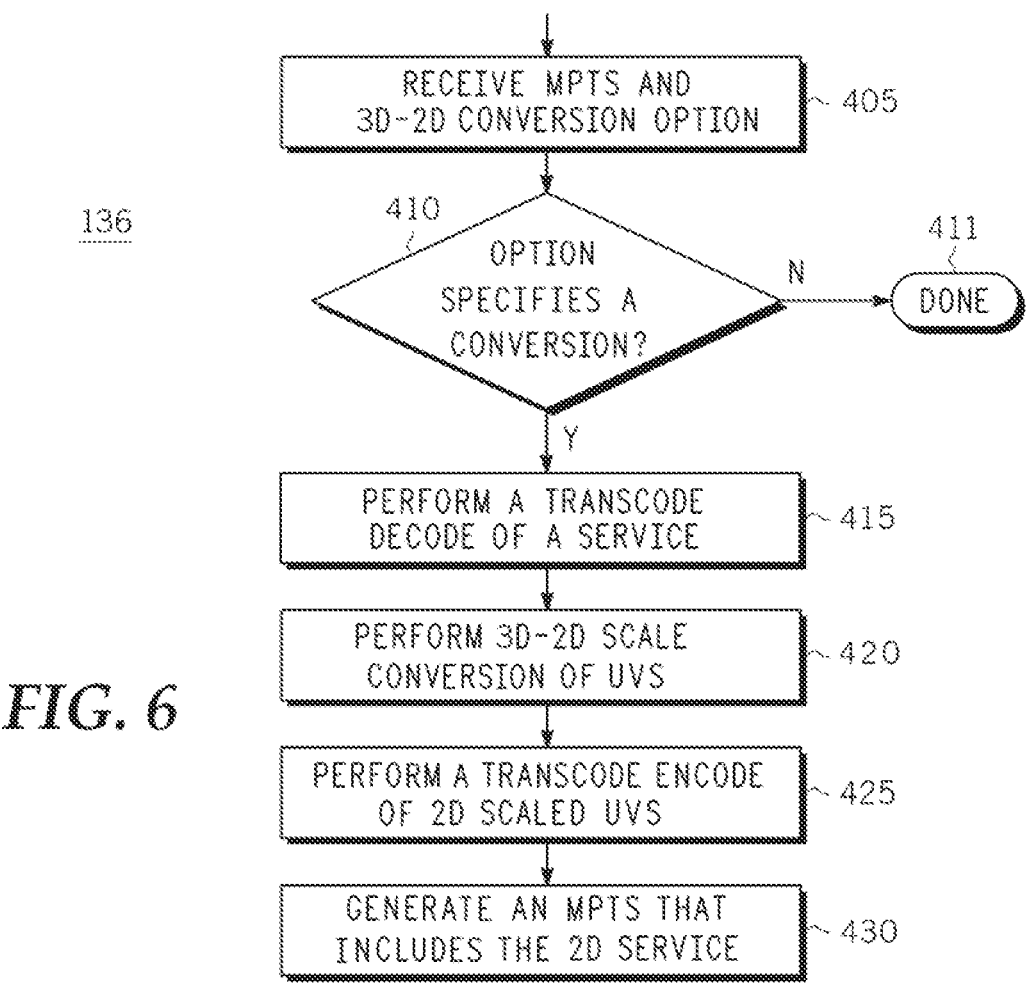
FIG. 6 is a flow chart that illustrates some steps that may be used to accomplish a step of FIG. 4, in accordance with certain embodiments.

Referring to FIG. 6, a flow chart illustrates some steps that may be used to accomplish step 136 "transcode and perform 3D-2D conversion of services" of FIG. 5, in accordance with certain embodiments. At step 405, a multiprogram program transport service is received that includes one or more compressed video services. It also includes distribution constraint data that specifies one or more 3D-2D conversion options. Each 3D-2D conversion option is applicable to one or more of the video services, as identified by each 3D-2D conversion option. Each 3D-2D conversion option may further identify whether a 3D-2D conversion is to be applied to the associated one or more of the video services. Each 3D-2D conversion option may further identify which specified type of 3D-2D scale conversion is to be performed. Note that in some embodiments, specific data may not be needed to indicate whether or not a 3D-2D conversion is to be performed. For example, in some embodiments, the absence of a 3D-2D conversion type in a 3D-2D conversion field may be sufficient to make the determination that 3D-2D conversion is not to be performed. In some embodiments, a simple indication that 3D-2D conversion is to be performed could indicate that a default type of 3D-2D conversion is to be performed. When a determination is made at step 410 that a 3D-2D conversion option is to be applied to one or more of the video services, an uncompressed video signal (UVS) is generated by performing a decoding portion of a transcoding operation for the one or more of the video services. Note that step 410 could be performed after the decode portion of a transcoding is performed. For example, a transcoding operation may be defined by default. In many situations the transcode operation is by default an MPEG 4 to HD MPEG 2 transcoding operation. In this instance, the transcoding type may not be specified in the 3D-2D conversion data, nor in the distribution constraint data. This would allow the decision step 410 to follow the transcode decode step 415. When a determination is made at step 410 that a 3D-2D conversion option is not to be applied to one or more of the video services, then the method ends at step 411.

A scale conversion for the one or more of the video services is then performed on the UVS at step 420 according to a specified type of 3D-2D conversion. In some embodiments, the type of 3D-2D conversion is specified by default. In these embodiments, whether to perform a 3D-2D operation may explicitly identified, such as by a binary value in the 3D-2D data. In some embodiments, one of a plurality of types of 3D-2D conversions may be specified in the 3D-2D conversion data, each by a unique value in the 3D-2D conversion data. One of the left and right 3D views that are both included in the 3D video service (or services) is used as an input for the scale conversion in step 420. A compressed video service is then generated by performing an encoding portion of the transcoding at step 425 on the UVS that has been 3D-2D scale converted. As noted above the type of transcoding may be by default or may be specified in the 3D-2D conversion option or elsewhere in metadata associated with the video services. A second multiprogram program transport service is generated that includes the compressed video service that has been 3D-2D converted at step 430.

Currently, some uplink operators provide both high definition (HD) services and standard definition (SD) services to cable operators in order to enable the cable operators to accommodate customers who do not subscribe to HD service. However, in case the uplink operator should discontinue providing SD services, the transcoder 116 may convert the incoming HD service to SD service in order to accommodate customers who do not subscribe to the HD level of service.

Figure 7:
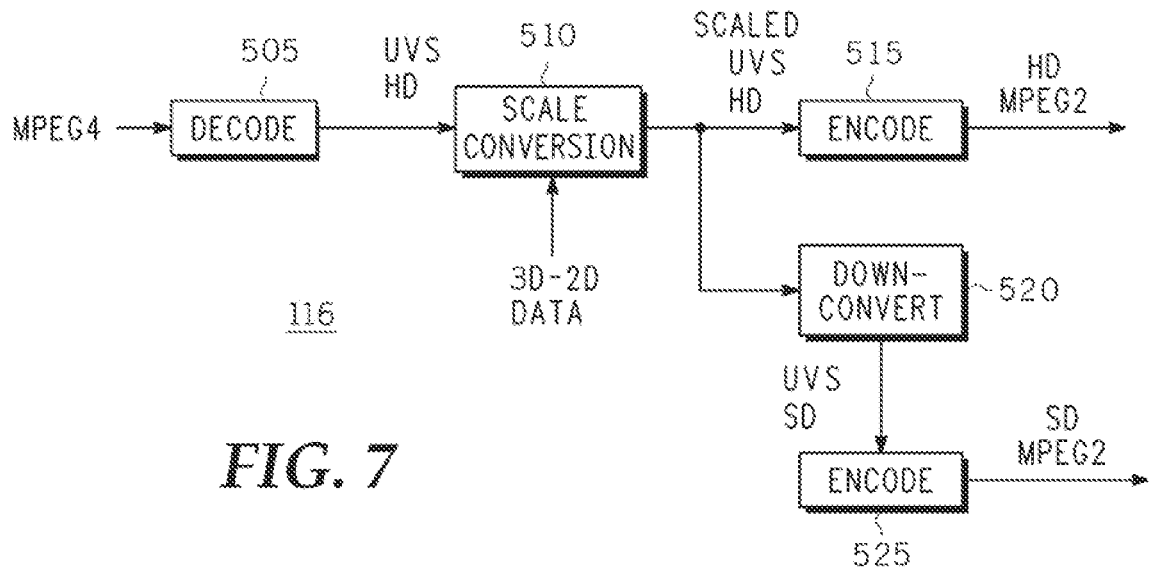
FIG. 7 is a schematic block diagram illustrating certain embodiments of the headend equipment shown in FIGS. 3 and 4, in accordance with certain embodiments.

Referring to FIG. 7, a schematic block diagram illustrates certain embodiments of the headend equipment shown in FIG. 4. The transcoder 116 includes a decoder 505 that performs the decoding portion of a transcoding operation, converting the HD MPEG 4 video access units to uncompressed video signals (UVS's). Some of the pictures may be converted from 3D to 2D by a scale conversion function 510 that operated as described above and below, An encoder 515 of the transcoder 116 then encodes the PESs as HD MPEG 2 pictures, and may also downconvert the decoded HD pictures to UVS SD using a down convert function 520. An encoder 525 then encodes the SD pictures as SD MPEG 2 pictures and thus provides an SD MPEG 2 service in addition to the HD MPEG 2 service. The SD MPEG 2 bit streams may be supplied to a statistical multiplexer (e.g., statistical multiplexer 118 of FIG. 2) that creates a cable MPTS for transmission over the cable 10 (FIG. 4). It will be appreciated that the SD cable MPTS may contain more than three services, and some of them can be 2D services obtained by the unique apparatus and methods described herein.

The distribution constraint data provided to the IRD that includes the transcoder and 3D-2D converter 116 shown in FIG. 7 may include the service selection data for the demultiplexer, may include statmux data for controlling statistical multiplexers, may include 3D-2D conversion option data for 3D-2D conversion and, in addition, may contain picture format data utilized by the downconverter 130 to determine how the 16×9 aspect ratio of the HD picture format should be adapted to the 4×3 aspect ratio of the SD picture format.

Although FIG. 7 illustrates an HD MPTS and an SD MPTS respectively, it will be appreciated that SD services and HD services may be included in the same MPTS. For example, instead of providing one MPTS containing HD services and another MPTS containing SD services, it may be preferable to provide two HD services and the corresponding SD services in the same MPTS.

Figures 13, 14, 15:
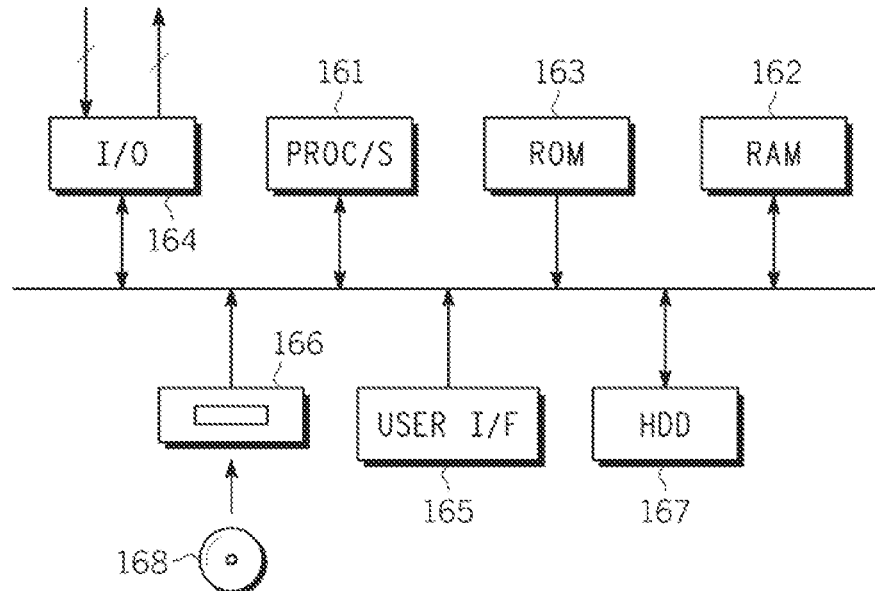

Referring to FIG. 8, a matrix illustrates one exemplary table of 3D-2D scale conversions that the 3D-2D conversion data may use to identify a specific type of scale conversion, in accordance with some embodiments. Each of the 14 items in this table may be identified by a value that is conveyed by the 3D-2D conversion data. For example, the 14 line items may be identified by a value from 1 to 14 that is included in the 3D-2D conversion data. In this example, A value of 7 may then indicate that the received picture is a line interleaved image of 1280×720×60 in a line input format (i.e., 1280 pixels wide, 720 pixels high, at a rate of 60 frames per second) that is to be scaled to an output resolution of 1280×720×60. In this instance, the left image of the video may be conveyed in the odd scan lines and the right image may be conveyed in the even scan lines. The output image is scaled by using a specified default image (e.g., the right image) and producing the output image by duplicating each even scan line into the next odd scan line, or by generating the pixel values of the odd scan lines by interpolating the values of the lines preceding and succeeding an even line that is to be generated. One such interpolation could be the average of the preceding and succeeding scan lines. The meanings of abbreviations used in FIG. 8 are OU=over under and SBS=side by side. The interpretation of some of the input and output formats is aided by FIGS. 9-14, which show where the left and right image pixels may found in the picture stream, in accordance with certain embodiments. FIG. 9 illustrates a side-by-side pixel format, with the pixels for the left image of a 3D image on the left and the pixels for the right image of the 3D image on the right of each frame. FIG. 10 illustrates an over-under pixel format, with the pixels for the left image of a 3D image on the top and the pixels for the right image of the 3D image on the bottom of each frame. FIG. 11 illustrates a frame sequential format, with the pixels for the left image of a 3D image included in frames that alternate with frames that include the pixels for the right image of the 3D image. In FIGS. 12-14, the X's can be interpreted as left pixels and the O's as right pixels. FIG. 12 and FIG. 13, respectively, illustrate pixels of left and right images arranged in alternating columns and lines in each frame, while FIG. 14 illustrates pixels arranged in a checkerboard pattern in each frame.

It can be seen from these figures that in the embodiments illustrated, the left and right 3D views are included in the one or more video services in one of a side-by-side, over-under, alternating lines, alternating columns, checker board, or frame sequential arrangement.

Although the description with reference to FIGS. 4-7 indicates that each transponder MPTS conveys only the distribution constraint data for the IRDs that are authorized to receive that particular transponder MPTS, the distribution constraint data is relatively static and accordingly it may be possible for each transponder MPTS to contain the distribution constraint data pertaining to all of the services. In addition, although the disclosed subject matter has been described with reference to distribution of television program material, it will be appreciated that the disclosed subject matter is also applicable to distribution of other video material, such as motion pictures by video-on-demand service.

Referring to FIG. 15, suitable headend equipment may be implemented using a computer 160 comprising one or more processors 161, random access memory 162, read only memory 163, I/O devices 164, a user interface 165, a CD ROM drive 166 and a hard disk drive 167, configured in a generally conventional architecture. The computer operates in accordance with a program that is stored in a computer readable medium, such as the hard disk drive 167 or a CD ROM 168, and is loaded into the random access memory 162 for execution. The program comprises instructions that when executed by the computer cause the computer to receive a bit stream representing an MPTS including a packetized data elementary stream, as described above, by way of a suitable interface included in the I/O devices 164, the computer allocates memory to appropriate buffers and utilizes other suitable resources and functions to perform the various operations that are described above as being performed by the headend equipment, with reference to the flow charts shown in FIGS. 5-7.

It will be appreciated by those skilled in the art that the program might not be loadable directly from the CD ROM 168 into the random access memory utilizing the CD ROM drive 166 and that generally the program will be stored on the CD ROM or other program distribution medium in a form that requires the program to be installed on the hard disk drive 167 from the CD ROM 168.

It will be appreciated that the unique 3D-2D conversion techniques and apparatus described herein allow a system operator to provide 2D video streams for customer having legacy set-top boxes and 2D TVs by converting programs supplied only in 3D format at the headend. This provides video services which customers having legacy TV's would not be able to enjoy unless they acquired a set top box which performed the 3D-2D conversion, which may be unavailable or costly.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

What is claimed is:

1. A method for converting video content, the method comprising:
   receiving a 3D video stream and metadata associated with the 3D video stream, wherein the metadata includes a type of 3D to 2D conversion applicable to the 3D video stream and wherein the type of 3D to 2D conversion is a value from a plurality of values that at least indicates an output resolution for a 2D video stream;
   determining that a 3D to 2D conversion is to be performed;
   in response to determining that the 3D to 2D conversion is to be performed, identifying the output resolution for the 2D video stream indicated by the type of 3D to 2D conversion; and
   converting the 3D video stream to the 2D video stream with the output resolution indicated by the type of 3D to 2D conversion.

2. The method of claim 1, wherein the type of 3D to 2D conversion further indicates an input resolution of the 3D video stream.

3. The method of claim 1, wherein the type of 3D to 2D conversion further indicates a manner in which a left 3D view and a right 3D view of the 3D video stream are included within the 3D video stream.

4. The method of claim 3, wherein pixels corresponding to the left 3D view are included in a left half of each frame of the 3D video stream and pixels corresponding to the right 3D view are included in a right half of each frame of the 3D video stream.

5. The method of claim 3, wherein the 3D video stream is converted to the 2D video stream with the output resolution indicated by the type of 3D to 2D conversion using either the left 3D video or the right 3D video.

6. The method of claim 1, wherein the metadata includes an indication of whether the left 3D video or the right 3D video is to be used to generate the 2D video stream.

7. The method of claim 1, wherein the output resolution further indicates a frame rate of the 2D video stream.

8. The method of claim 1, wherein the metadata includes picture format data that indicates a manner in which an aspect ratio of the 3D video stream is to be adapted during conversion of the 3D video stream to the 2D video stream.

9. A system for converting video content, the system comprising:
   a hardware processor that:
   receives a 3D video stream and metadata associated with the 3D video stream, wherein the metadata includes a type of 3D to 2D conversion applicable to the 3D video stream, and wherein the type of 3D to 2D conversion is a value from a plurality of values that at least indicates an output resolution for a 2D video stream;
   determines that a 3D to 2D conversion is to be performed;
   in response to determining that the 3D to 2D conversion is to be performed, identifies the output resolution for the 2D video stream indicated by the type of 3D to 2D conversion; and
   converts the 3D video stream to the 2D video stream with the output resolution indicated by the type of 3D to 2D conversion.

10. The system of claim 9, wherein the type of 3D to 2D conversion further indicates an input resolution of the 3D video stream.

11. The system of claim 9, wherein the type of 3D to 2D conversion further indicates a manner in which a left 3D view and a right 3D view of the 3D video stream are included within the 3D video stream.

12. The system of claim 11, wherein pixels corresponding to the left 3D view are included in a left half of each frame of the 3D video stream and pixels corresponding to the right 3D view are included in a right half of each frame of the 3D video stream.

13. The system of claim 11, wherein the 3D video stream is converted to the 2D video stream with the output resolution indicated by the type of 3D to 2D conversion using either the left 3D video or the right 3D video.

14. The system of claim 9, wherein the metadata includes an indication of whether the left 3D video or the right 3D video is to be used to generate the 2D video stream.

15. The system of claim 9, wherein the output resolution further indicates a frame rate of the 2D video stream.

16. The system of claim 9, wherein the metadata includes picture format data that indicates a manner in which an aspect ratio of the 3D video stream is to be adapted during conversion of the 3D video stream to the 2D video stream.

17. A non-transitory computer-readable medium containing computer executable instructions that, when executed by a processor, cause the processor to perform a method for converting video content, the method comprising:
   receiving a 3D video stream and metadata associated with the 3D video stream, wherein the metadata includes a type of 3D to 2D conversion applicable to the 3D video stream and wherein the type of 3D to 2D conversion is a value from a plurality of values that at least indicates an output resolution for a 2D video stream;
   determining that a 3D to 2D conversion is to be performed;
   in response to determining that the 3D to 2D conversion is to be performed, identifying the output resolution for the 2D video stream indicated by the type of 3D to 2D conversion; and
   converting the 3D video stream to the 2D video stream with the output resolution indicated by the type of 3D to 2D conversion.

* * * * *